(12) United States Patent
Frenal et al.

(10) Patent No.: US 11,624,464 B2
(45) Date of Patent: Apr. 11, 2023

(54) DEVICE FOR SUPPLYING PRESSURIZED FLUID, AND ASSEMBLY FOR STORING PRESSURIZED FLUID COMPRISING SUCH A DEVICE

(71) Applicant: L'Air Liquide, Société Anonyme pour l'Etude et l'Exploitation des Procédés Georges Claude, Paris (FR)

(72) Inventors: Antoine Frenal, Ezanville (FR); Guillaume Casaert, Gennevilliers (FR); Valérie Nille, Les Loges en Josas (FR); Sébastien Gorry, Ermont (FR); René Fogen, Belgique (BE); Morgan Lamiable, Metzervisse (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 373 days.

(21) Appl. No.: 16/878,765

(22) Filed: May 20, 2020

(65) Prior Publication Data

US 2020/0370694 A1    Nov. 26, 2020

(30) Foreign Application Priority Data

May 21, 2019   (FR) .................................... 1905328

(51) Int. Cl.
| | | |
|---|---|---|
| *F17C 13/04* | (2006.01) | |
| *F16L 37/08* | (2006.01) | |
| *F16L 37/38* | (2006.01) | |

(52) U.S. Cl.
CPC ............... *F16L 37/08* (2013.01); *F16L 37/38* (2013.01); *F17C 13/04* (2013.01); *F16L 2201/10* (2013.01)

(58) Field of Classification Search
CPC ........ F17C 13/04; F16L 37/08; F16L 2201/10
See application file for complete search history.

(56) References Cited

U.S. PATENT DOCUMENTS

| | | | |
|---|---|---|---|
| 2017/0122497 A1* | 5/2017 | Bernard | ................. G05B 15/02 |
| 2018/0024575 A1* | 1/2018 | De Potter | ............ G05D 7/0635 |
| | | | 137/98 |

(Continued)

FOREIGN PATENT DOCUMENTS

| | | |
|---|---|---|
| EP | 3 273 139 | 1/2018 |
| EP | 3 299 694 | 3/2018 |

(Continued)

OTHER PUBLICATIONS

French Search Report for corresponding FR 1905328, dated Jan. 31, 2020.

*Primary Examiner* — Paul J Gray
(74) *Attorney, Agent, or Firm* — Elwood L. Haynes

(57) ABSTRACT

A device for supplying pressurized fluid, comprising a first valve) and a second valve accommodating internal circuits, the first valve and the second valve including respective coupling members that form a quick-connection system for removably connecting the second valve to the first valve, the internal circuits including a set of one or more control valves the device including at least one manually actuable mobile control member for controlling the set of one or more control valves, between a first, rest position, in which the flow of fluid towards the outlet is prevented, and a second, active position, in which the flow of fluid towards the outlet is allowed, the quick-connection system including a connection piece for connecting the second valve to the first valve between a first position.

10 Claims, 2 Drawing Sheets

(56) References Cited

U.S. PATENT DOCUMENTS

2018/0087688 A1\* 3/2018 Frenal ................. F16K 37/0025
2019/0293239 A1 9/2019 Frenal et al.

FOREIGN PATENT DOCUMENTS

EP 3 161 371 9/2018
WO WO 2018 015624 1/2018

\* cited by examiner

DEVICE FOR SUPPLYING PRESSURIZED FLUID, AND ASSEMBLY FOR STORING PRESSURIZED FLUID COMPRISING SUCH A DEVICE

CROSS REFERENCE TO RELATED APPLICATIONS

This application claims the benefit of priority under 35 U.S.C. § 119 (a) and (b) to French Patent Application No. 1905328, filed May 21, 2019, the entire contents of which are incorporated herein by reference.

BACKGROUND

The invention relates to a device for supplying pressurized fluid and to an assembly for storing pressurized fluid comprising such a device.

SUMMARY

The invention relates more particularly to a device for supplying pressurized fluid, in particular pressurized gas, comprising a first valve accommodating an internal fluid circuit, the device having a second valve comprising an internal circuit, the second valve forming a physical entity different from the first valve, the first valve and the second valve comprising respective coupling members that form a quick-connection system for removably connecting the second valve to the first valve, the internal circuits comprising a set of one or more control valves for allowing or preventing the flow of the fluid towards an outlet of the device when the second valve is coupled to the first valve via the quick-connection system, the device comprising at least one manually actuable mobile control member for controlling the set of one or more control valves, the control member being able to move between a first, rest position, in which the flow of fluid towards the outlet is prevented, and a second, active position, in which the flow of fluid towards the outlet is allowed, the quick-connection system comprising a connection piece for connecting the second valve to the first valve, the connection piece being able to move between a first position, in which the quick connection between the second valve and the first valve has not been established, and a second position, in which the quick connection between the second valve and the first valve has been established, the second valve comprising at least one electrical member and in particular an electronic controller and a battery for supplying power to the at least one electrical member.

The invention relates in particular to a modular fluid supply device comprising one or more electronic members (in particular at least one wireless communication member) that are supplied with electric power by at least one battery. These devices generally have to have energy autonomy. This requires optimizing electrical consumption in order to preserve the autonomy of the battery and limit maintenance operations.

This type of device should also preferably be capable of diagnosing and signalling anomalies or faults.

The invention applies in particular to any electronic device embedded in a gas supply system (removable valve for example) able to be connected to a connector or valve of an energy-autonomous pressurized fluid cylinder. The removable valve has for example a plurality of sensors (sensors(s) for sensing the position of the mechanical connection members between the two entities (valves), sensor(s) for sensing the position of a member for controlling the opening of control valve(s) (levers or the like), pressure sensors(s), etc.). The removable valve preferably has one or more batteries, a controller (electronic card, microprocessor or the like), a radiofrequency communication antenna, an NFC antenna and a differentiated operating mode with in particular possible putting of the electrical members into sleep mode with complete or partial activation conditions, different communication modes (frames, frequency and long range).

One object of the present invention is to alleviate all or some of the above-mentioned drawbacks of the prior art.

To this end, the device according to the invention, also in accordance with the generic definition thereof given in the above preamble, is essentially characterized in that it has a sensor for sensing the position of the connection piece and a sensor for sensing the position of the control member, said sensors being connected to the controller, the at least one electrical member being able to switch between two distinct given operating states, the controller being configured so as to switch the at least one electrical member between the two operating states depending on the combination of the measurements from the sensor for sensing the position of the connection piece and from the sensor for sensing the position of the control member.

Furthermore, embodiments of the invention may include one or more of the following features:
- the at least one electrical member is able to switch between two operating states having different levels of electrical consumption, in particular between an active state and a standby state,
- the at least one electrical member comprises a wireless data transmission member able to switch between a state of emitting a signal and a state of not emitting a signal and/or between distinct states of emitting signals at different respective frequencies,
- when the sensor for sensing the position of the connection piece detects that the connection piece is in its second position and the sensor for sensing the position of the control member changes from its second position to its first position, the controller is configured so as to perform at least one of: command the transmission member to remotely send a signal representative of the change in position of the control member, reduce the frequency of the remote sending of signals by the transmission member,
- the second valve comprises a pressure sensor in the circuit, said pressure sensor generating an electrical measurement signal and being connected to the controller,
- when the sensor for sensing the position of the connection piece detects that the connection piece is in its second position and the sensor for sensing the position of the control member changes from its second position to its first position, the controller is configured so as to command the stoppage or the reduction of the reading of the pressure measurement from the pressure sensor,
- the second valve comprises a member for reading a radio tag, such as a near-field communication "NFC" communication antenna,
- when the sensor for sensing the position of the connection piece detects a change of the connection piece from its first position to its second position and this detection is followed by a detection, by the sensor for sensing the position of the control member, of the control member changing from its first position to its second position, the controller is configured so as to activate the member for reading a radio tag and to process the received signal, in its first position, the connection piece blocks the control member in its first, rest position so as to prevent it moving to its second, active position and, in its second position, the connection piece does not block the control member in its first, rest position so as to allow it to move to its second, active position and, when the sensor for sensing the position of the connection piece detects that the connection piece is in its first position and, at the same time, the sensor for sensing the position of the control member is in its second position, the controller is configured so as to generate a visual and/or audio and/or electromagnetic warning signal, when the sensor for sensing the position of the connection piece detects that the connection piece is in its first position and, at the same time, the pressure sensor measures a pressure greater than a threshold or delivers a pressure measurement signal, the controller is configured so as to generate a visual and/or audio and/or electromagnetic warning signal, the connection piece comprises or consists of a member for locking/unlocking the mechanical link of the coupling members of the quick-connection system, in particular a sleeve able to move in translation.

the internal circuit of the first valve extends between a first, upstream end intended to be in communication with a source of pressurized fluid and a downstream end, the internal circuit of the first valve comprising an isolation valve for opening or closing the internal circuit, the internal circuit of the second valve comprising an upstream end intended to be in communication with the downstream end of the internal circuit of the first valve when the second valve is coupled to the first valve and a downstream end forming the outlet that is intended to be connected to an apparatus that uses the fluid, the second valve comprising a mobile member for actuating the isolation valve of the first valve in order to command the opening or closing of the latter, the movement of said mobile actuating member being controlled by the control member, the first valve comprises a cylindrical end extending along a longitudinal axis, the quick-connection system comprising at least one groove or rib formed on the cylindrical end of the first valve and a system of coupling balls or claws that is secured to the second valve and interacts with the at least one groove or rib formed on the cylindrical end of the first valve, in its first position, the locking/unlocking member allows a relative offset of the coupling members forming the quick-connection system and, in its second position, the locking/unlocking member reduces or does not allow the relative offset of the coupling members forming the quick-connection system, the locking/unlocking member is mounted on the second valve so as to be able to move in translation and/or rotation, the control member comprises a pivotable lever and/or a button that is able to move in translation and/or a rotary handwheel, the blocking of the control member by the connection piece is mechanical and/or magnetic and/or pneumatic blocking that is direct or via an intermediate piece such as a retractable end stop, in its second, active position, the control member blocks the connection piece in its second position, so as to prevent the second valve and the first valve from being separated, and, in its first, rest position, the control member does not block the connection piece in its second position, so as to allow it to move towards its first position and thus allow the second valve and the first valve to be separated, the blocking of the connection piece by the control member is mechanical and/or magnetic and/or pneumatic blocking that is direct or via an intermediate piece such as a retractable end stop, in its second, active position, the control member blocks the locking/unlocking member in its second position, so as to prevent the second valve and the first valve from being separated, and, in its first, rest position, the control member does not block the locking/unlocking member in its second position, so as to allow it to move towards its first position and thus allow the second valve and the first valve to be separated, the blocking is mechanical and/or magnetic and/or pneumatic blocking that is direct or via an intermediate piece such as a retractable end stop.

The invention may also relate to an assembly for storing pressurized fluid, comprising a device according to any one of the features above or below.

The invention may also relate to any alternative device or method comprising any combination of the features above or below within the scope of the claims,

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
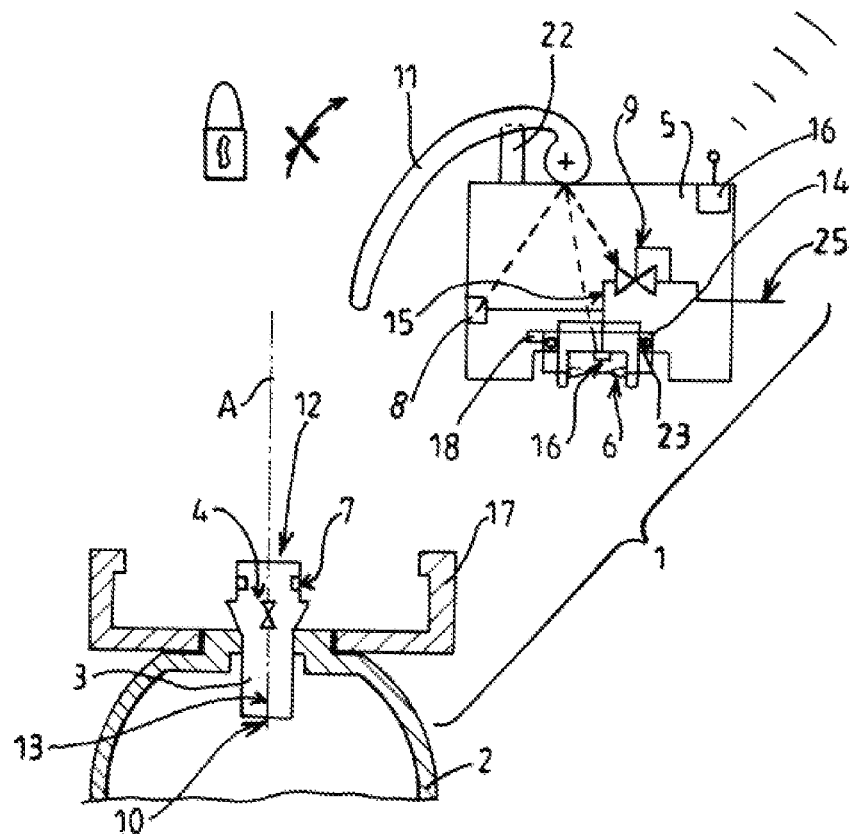
FIG. 1 shows a schematic and partial view in cross section, illustrating the mechanical structure of an exemplary embodiment of a device for supplying fluid in a disconnected or separated state.

As illustrated in FIG. 1, the device 1 for supplying pressurized fluid, in particular pressurized gas, comprises a first valve 3 mounted in the orifice of a tank 2 and surrounded by a protective cap 17.

The first valve 3 accommodates an internal fluid circuit 13 provided with at least one isolation member 4 for opening or closing the internal circuit 13. The isolation member 4 is an isolation valve, for example.

Figure 2:
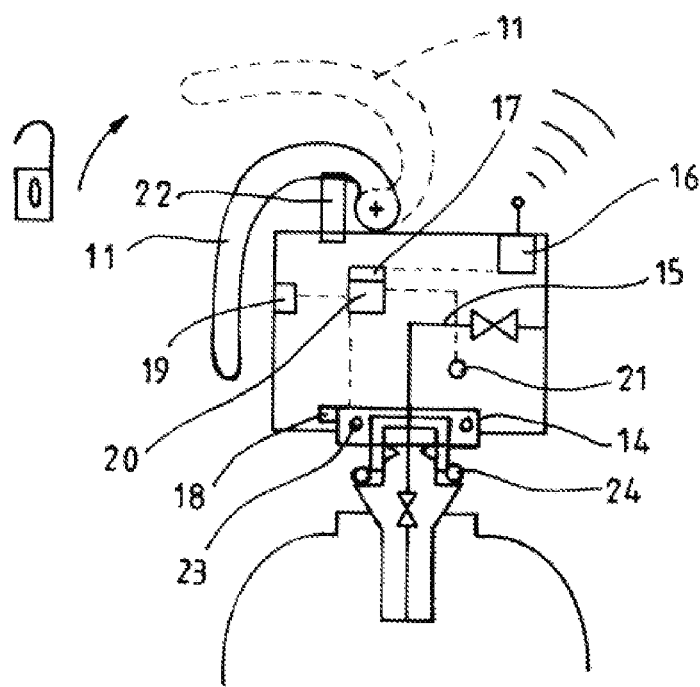
FIG. 2 shows a view similar to that of FIG. 1 in a coupled/connected (locked) state and illustrating the electronic components of the device.

The device 1 comprises a second valve 5 forming a distinct (separable) physical entity from the first valve 3 (both in the disconnected position in FIG. 1 and in the connected/coupled position in FIG. 2).

The second valve 5 is provided with an internal fluid circuit 15 comprising a first, upstream end designed to be fluidically connected to a downstream end 12 of the internal circuit 13 of the first valve 3. The two valves 3, 5 are configured to put their internal circuits 13, 15 into communication when the second valve 5 has been correctly coupled to the first valve 3 via the quick-connection system.

The internal circuit 15 of the second valve 5 may comprise, for example, at least one member 9 for controlling the fluid flow (for example a control valve and/or a fixed or variable pressure reducer and/or a flow rate regulator). The second valve 5 preferably also comprises a mobile member 16 for actuating the isolation member 4 of the first valve 3 so as to command the opening or the closing of the latter. For example, the mobile actuating member 16 comprises a mobile valve driver, the movement of which is controlled by a manual control member 11 carried by the second valve 5. The control member 11 comprises a lever 11 in this example, but could comprise a push-button, a handwheel or any other appropriate member. The lever 11 may, if necessary, control the member 9 for controlling the flow of fluid.

The first valve 3 and the second valve 5 comprise respective coupling members 6, 7 that form a male/female quick-connection/coupling system for removably connecting/coupling the second valve 5 to the first valve 3.

For example, the first valve 3 comprises a cylindrical terminal end, extending along a central longitudinal axis A, to which the second valve 5 is connected. The quick-connection system may comprise at least one groove or rib 7 formed on the cylindrical end of the first valve 3 and a system of claws, balls 6 (or any appropriate equivalent coupling element) secured to the second valve 5.

The coupling element(s) 6 of the second valve 5 are preferably able to move and are able to be locked/unlocked by, for example, a mobile locking member 14 on the second valve 5. The coupling element(s) 6 of the second valve 5 interact with the at least one groove or rib 7 formed on the cylindrical end of the first valve 3.

The lever 11 is able to move between a first, rest position, in which the flow of fluid towards the outlet 25 is prevented (cf. for example the low position of the lever 11 in FIG. 1) and a second, active position, in which the flow of fluid towards the outlet 25 is allowed (cf. the dashed-line position in FIG. 1).

The quick-connection system comprises a connection piece 14 for connecting the second valve 5 to the first valve 3, for example a locking/unlocking member 14 of the quick connection. This connection piece 14 is able to move between a first position, in which the quick connection between the second valve 5 and the first valve has not been established (cf. FIG. 1) and a second position, in which the quick connection between the second valve 5 and the first valve 3 has been established (cf. FIG. 2).

This connection piece 14 is preferably is a locking/unlocking member 14 for locking/unlocking the quick connection, this locking/unlocking member 14, depending on its position, allows or does not allow the movement of the mobile coupling members 6 (and thus a mechanical connection/disconnection). In its second position, the locking/unlocking member 14 does not allow the movement of the mobile coupling members 6 (blocking/locking in mechanically connected position).

The connection piece 14 is thus an indicator between a correct (for example locked) connection, for the one part, and a lack of connection or incorrect or incomplete connection (no mechanical connection or incomplete, non-locked connection), for the other part.

In its first position, the connection-locking/unlocking member 14 preferably blocks the control lever 11 in its first, rest position, so as to prevent it from moving towards its second, active position (cf. FIG. 1, this locking being symbolized by a closed padlock and a struck-through lever rotation arrow).

In its second position, the locking/unlocking member 14 does not block the control lever 11 in its first, rest position, so as to allow it to move towards its second, active position (cf. FIG. 2, in which this unlocking is symbolized by an open padlock and a lever rotation arrow that is not struck through).

In other words, if the locking/unlocking member 14 is not in a position that corresponds to correct and locked coupling of the two valves 3, 5, this locking member 14 directly or indirectly prevents the lever 11 from being able to move into its active position (rotation blocked, for example).

The locking/unlocking member 14 of the mechanical connection of the coupling members 6, 7 of the quick-connection system may comprise a sleeve or a ring that is able to move in translation on the second valve 5. This locking member 14 is for example able to move between a first, unlocking position (high position, cf. FIG. 1) and a second, locking position (low position, cf. FIG. 2).

In the first position, the locking/unlocking member 14 allows for example the travel/movement of the mobile coupling members 6 (second valve 5 separated or separable from the first valve 3).

In the second, locking position, the locking/unlocking member 14 prevents for example the travel/movement of the mobile coupling members 6 (second valve 5 correctly coupled completely to the first valve 3).

The blocking of the control lever 11 by the locking/unlocking member 14 is preferably mechanical blocking that is direct or via an intermediate piece such as a retractable end stop (cf. reference 22). Of course, this blocking could also or alternatively be magnetic and/or pneumatic for example.

The blocking of the lever 11 by the locking/unlocking member 14 is for example mechanical blocking brought about by an intermediate piece of the device having an end interacting with a portion of the lever 11 and an end interacting with the locking/unlocking member 14. The intermediate piece 22 forms or does not form a mechanical end stop for the lever 11 depending on the position of the locking/unlocking member 14.

In the examples described above, the connection piece 14 which blocks or does not block the lever 11 is a locking member 14 for locking the quick connection. Of course, other embodiment variants are possible and in particular this function of blocking the lever 11 when the second valve 5 is not correctly coupled to the first valve 3 could be ensured in the same way (directly or indirectly) by another mobile piece of the quick-connection system (for example by a claw or hook or ball or intermediate movement-transmitting piece of the quick connection).

Furthermore, this mechanism (or another mechanism) for blocking the lever 11 preferably prevents the separation of the two valves 3, 5 (for example by preventing the locking/unlocking member 14 from moving towards its first, unlocking position) as long as the lever 11 is not in its first, rest position.

For example, in its second, active position, the control lever 11 blocks the locking/unlocking member 14 in its second position, so as to prevent separation of the second valve 5 and the first valve 3.

Moreover, in its first, rest position, the lever 11 does not block the locking/unlocking member 14 in its second position, so as to allow it to move towards its first position and thus permit the separation of the second valve 5 and the first valve 3.

Thus, this architecture prevents disconnection of the second valve 5 from the first valve 3 if the lever 11 is in its position that commands the opening of the one or more internal circuits. This blocking is preferably achieved via the locking/unlocking member 14.

This blocking of the locking/unlocking member 14 by the control level 11 may be direct or indirect and preferably mechanical, but could be magnetic and/or pneumatic or other.

As illustrated, the second valve 5 comprises at least one electrical member 16, 23 and in particular an electronic controller 20 and a battery 17 for supplying power to the at least one electrical member 16, 23.

For example, the second valve 5 comprises a wireless data transmission member 16 such as a radiofrequency communication antenna, for example one with a long range and low consumption (and/or any other communication mode, RFID, Bluetooth, GSM, etc.).

The second valve 5 also includes a sensor 18 for sensing the position of the connection piece 14 and a sensor 19 for sensing the position of the control member 11.

These sensors 18, 19 (which are magnetic and/or electromechanical and/or electrical and/or mechanical) are connected to the controller 20 and generate an electrical signal that is transmitted to the controller 20. In particular, at least one of these sensors 18, 19 may be a bistable sensor detecting two positions or two distinct states of the mobile piece in question (member 11 or piece 14) and generating an (electrical or magnetic or other) signal in the event of a position change. For example, each sensor 18, 19 may comprise a switch able to move with the piece 11 or 14 bearing it (or a detectable mobile element) and that interacts with two fixed detectors situated on the body of the second valve 5 and corresponding to the two positions. As a variant, the sensitive element is able to move with the piece and interacts, depending on its position, with two detectable elements situated on the body of the second valve 5 and corresponding to the two positions.

The second valve 5 also preferably comprises a member 23 for reading a radio tag, such as a near-field communication "NFC" communication antenna. This read (and possibly write) member 21 is configured so as to communicate wirelessly with a conjugate member 24 (for example an antenna communicating using the same technology) that is situated on the first valve 3. For example, the antenna 24 of the first valve is able to be read by the antenna 23 of the second valve in order to identify the corresponding cylinder 2 and read (and possibly write) information relevant in this regard, etc.

As illustrated, the second valve 5 preferably furthermore includes a sensor 21 for measuring the pressure in the circuit 15. This pressure sensor 21 is configured so as to generate an electrical measurement signal and is connected to the controller 20.

At least one of the electrical members of the second valve 5 and in particular the communication antenna 16 is able to switch between two distinct given operating states.

In addition, the controller 20 is configured so as to switch the or the at least one electrical member (including itself) between the two operating states depending on the combination of the measurements from the sensor 18 for sensing the position of the connection piece 14 and from the sensor 19 for sensing the position of the control member 11. That is to say, depending on the relative positions (and/or their respective sequential movements) of the control member 11 and of the connection piece 14, the controller 20 adapts the operation and in particular the electrical consumption of the electrical members.

For example, all or some of the electrical members are able to switch between two operating states having distinct levels of electrical consumption, in particular between an active state and a standby state (or state of relatively lower activity).

For example, the wireless data transmission member 16 is able to switch between a state of emitting a signal and a state of not emitting a signal and/or between distinct states of emitting signals at different respective frequencies (or different data emissions).

Thus, for example, when the sensor 18 for sensing the position of the connection piece 14 detects that the connection piece 14 is in its second position (valves 3, 5 connected) and the sensor 19 for sensing the position of the control member 11 changes from its second position to its first position (closed fluidic circuit), the controller 20 may be configured so as to perform at least one of: command the transmission member 16 to remotely send a signal representative of the change in position of the control member 11 and/or reduce the frequency of the remote sending of signals by the transmission member 16.

Likewise, when the sensor 18 for sensing the position of the connection piece 14 detects that the connection piece 14 is in its second position (valves 3, 5 connected) and the sensor 19 for sensing the position of the control member 11 changes from its second position to its first position (closure of the fluidic circuit), the controller 20 may be configured so as to command the stoppage or the reduction of the reading of the pressure measurement from the pressure sensor 21 and/or reduce the measurement frequency of this sensor 21.

When the sensor 18 for sensing the position of the connection piece 14 detects a change of the connection piece 14 from its first position to its second position (valves 3, 5 connected) and this detection is followed by a detection, by the sensor 19 for sensing the position of the control member 11, of the control member changing from its first position to its second position (opening of the circuit), the controller 20 may be configured so as to activate, in response, the member 23 for reading a radio tag and to process the signal received by this read member 23.

If the connection piece 14 blocks the control member 11 in its first, rest position (cf. above and, by contrast, when the active position of the lever 11 blocks the separation of the connected valves 3, 5), the controller 20 may be configured so as to detect an operating anomaly.

Thus, when the sensor 18 for sensing the position of the connection piece 14 detects that the connection piece 14 is in its first position (valves 3, 5 not connected) and, at the same time, the sensor 19 for sensing the position of the control member 11 is in its second position (opening of the fluidic circuit), the controller 20 may be configured so as to generate a visual and/or audio and/or electromagnetic warning signal.

Likewise, when the sensor 18 for sensing the position of the connection piece 14 detects that the connection piece 14 is in its first position (valves 3, 5 not connected) and, at the same time, the pressure sensor 21 measures a pressure greater than a threshold or delivers a pressure measurement signal, the controller 20 may be configured so as to generate a visual and/or audio and/or electromagnetic warning signal.

Figure 3:
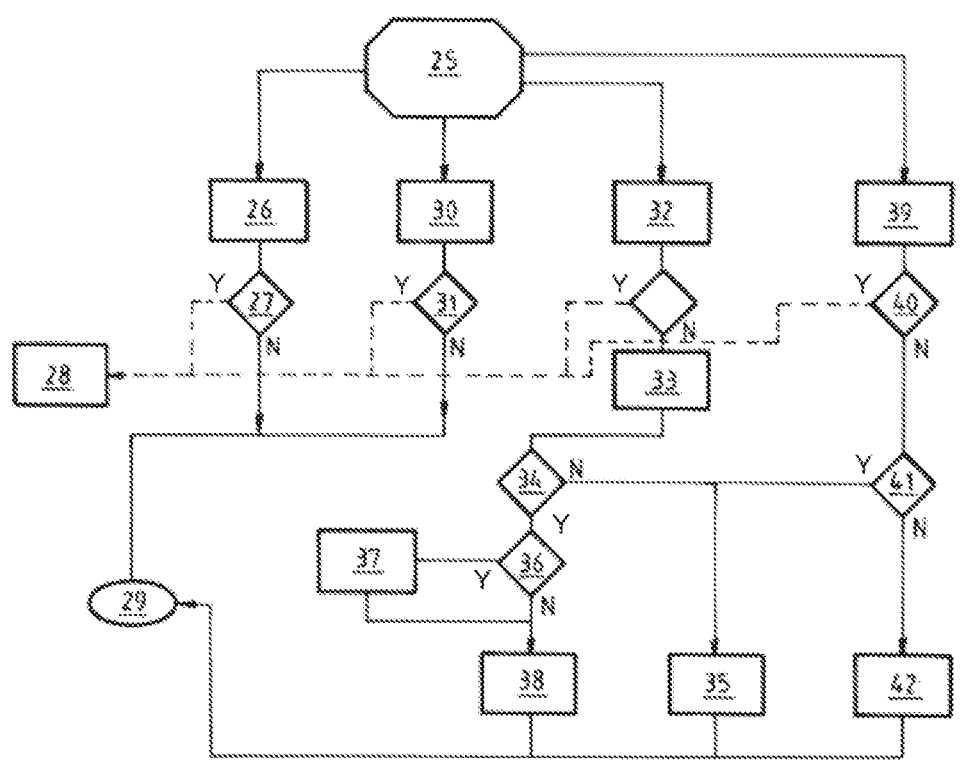
FIG. 3 shows a schematic and partial view, illustrating various possible modes of use of the device in the form of a flowchart.

These operating modes and other possibilities are illustrated in FIG. 3.

The controller 20 may in particular be configured so as to have the electronic member(s) (including itself) in what is called a "deep sleep" state in which activity and electrical consumption are reduced to a minimum (no remote communication via the member 16 in particular). This mode may be communicated to the controller 20 of the second valve 5 via one of the communication members 16, 23 for example. This may be provided in particular for the purpose of long storage without use, for example when leaving the factory where the device is produced.

Starting from this deep sleep mode or step 25, when the sensor 18 for sensing the position of the connection piece 14 detects that the connection piece 14 changes to its second position (step 26=connection of the valves 3, 5), the controller 20 is then able to verify, in a following or simultaneous step 27, whether the sensor 19 for sensing the position of the control unit 11 was or is in its second (active) position. If so (Y), an error signal may be generated (step 28), since this goes against the safety provision that prohibits connection of two valves 3, 5 while the control member 11 is in the active position. If not (N), a step 29 of awaiting normal operation is reached.

If on the other hand the sensor 18 for sensing the position of the connection piece 14 detects that the connection piece 14 changes to its first position (separation of the valves 3, 5) (step 30), the controller 20 is able to verify, in a following or simultaneous step 31, whether the sensor 19 for sensing the position of the control unit 11 was or is in its second (active) position. If so (Y), an error signal may be generated (step 28), since this goes against the safety provision that prohibits separation of two valves 3, 5 while the control member 11 is in the active position. If not, a step 29 of awaiting normal operation is reached.

If on the other hand the sensor 19 for sensing the position of the control member 11 detects that the control member 11 changes to its second, active position (step 32), the controller 20 is able to verify, in a following or simultaneous step 33 (via the sensor 18), whether the connection piece 14 is in its first position (valves 3, 5 not connected).

If so (Y), an error signal may be generated (step 28), since this goes against the safety provision that prohibits opening of the circuit while the two valves 3, 5 are not connected. If not (N), in a following step 33, the controller 20 may command at least one of: activate (read) the member 23 for reading a radio tag, activate (measure) the various sensors, in particular the pressure sensor 21. The controller 20 is then able to verify whether it receives information from the member 23 for reading a radio tag (step 34).

If not (N), the controller is able to switch to an operating mode (step 35) for example in which the data transmission member (16) does not send any or sends very few remote messages.

If so (Y), the controller is able to process the received information and determine whether or not the second valve 5 is connected to a new cylinder (that is to say whether it has received an identifier different from the one read previously) (step 36).

If so (Y), the controller 20 is able to switch to an operating mode (step 37) for example in which the data transmission member (16) sends a remote message in order to signal in particular this cylinder change.

If not (N) (and possibly after step 37), the controller 20 is able to switch to an operating mode (step 38) in which the second valve 5 is active (activating measurements of the sensor(s), processing information, light signals, etc.).

If on the other hand the sensor 19 for sensing the position of the control member 11 detects that the control member 11 changes to its first, inactive position (step 39), the controller 20 is able to verify, in a following or simultaneous step 40 (via the sensor 18), whether the connection piece 14 is or was in its first position (valves 3, 5 not connected).

If so (Y), an error signal may be generated (step 28), since this goes against the safety provision that prohibits manipulation of the lever 11 to its active position while the two valves 3, 5 are not connected.

If not (N), in a following step 41, the controller 20 is able to verify whether or not the valve was already in a standby mode.

If so (O), the controller is able to switch to an operating mode (step 35) for example in which the data transmission member (16) does not send any or sends very few remote messages.

If not (N), the controller is able to switch to an inactive operating mode (step 42) for example in which the data transmission member (16) sends this remote state change information.

At the end of steps 35, 38 and 42, the controller is able to switch to a given step 29 of awaiting normal operation.

This (these) mode(s) of operation make it possible to optimize the operation of the device in terms of energy by determining in particular the most appropriate time to activate and perform reading via the read member 23.

The sensors and the electronic logic 20 make it possible to detect and signal malfunctions.

Specifically, the presence of various sensors 18, 19 that normally activate in a given logic or order (connection piece 14 and control member 11) make it possible to signal, for example to a remote communication platform, inconsistencies between the mechanics and the electronics, and therefore risks of a fault.

The sending of this information or these signals may be analysed by an Internet of Things (IoT) platform.

In response to a warning, a signal, for example a light signal, may be activated on the device, in particular on the second valve 5 provided with a warning mechanism for this purpose.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A device for supplying pressurized fluid, comprising: a first valve comprising a first internal fluid circuit, a second valve comprising a second internal fluid circuit, wherein the second valve is separate and distinct from the first valve, the first valve comprising a first coupling member and the second valve comprising a second coupling member, configured to form a quick-connection system for removably connecting the second valve to the first valve, the quick-connection system comprising a connection piece for connecting the second valve to the first valve, the first internal fluid circuit comprising a first control valve and the second internal fluid circuit comprising a second control valve, wherein the first control valve and the second control valve are configured to allow or prevent a flow of the fluid towards an outlet of the device when the second valve is coupled to the first valve via the quick-connection system, the device comprising at least one manually actuatable mobile control member for controlling the first control valve and/or the second control valve, the manually actuatable mobile control member configured to move between a rest position, configured such that the flow of fluid towards the outlet is prevented, and an active position, configured such that the flow of fluid towards the outlet is allowed, wherein the connection piece is configured to move between a first position, in which the quick connection between the second valve and the first valve has not been established, and a second position, in which the quick connection between the second valve and the first valve has been established, the second valve comprising at least one electrical member and an electronic controller and a battery for supplying power to the at least one electrical member, the device also comprising a first sensor for sensing the position of the connection piece and a second sensor for sensing the position of the control member, the first sensor and the second sensor being connected to the controller, the at least one electrical member configured to switch between a first operating state and a second operating state, the controller being configured to switch the at least one electrical member between the first operating state and the second operating state depending on a combination of the measurements from the first sensor the second sensor, wherein, in the first position, the connection piece blocks the control member in the rest position thereby preventing movement towards the active position, in the second position, the connection piece does not block the control member in the rest position thereby allowing movement towards the active position, and when the first sensor detects that the connection piece is in the first position and, simultaneously, the second sensor is in the second position, the controller is thereby generating a visual and/or audio and/or electromagnetic warning signal.

2. The device according to claim 1, wherein the at least one electrical member is configured to switch between two operating states having different levels of electrical consumption.

3. The device according to claim 1, wherein the at least one electrical member comprises a wireless data transmission member configured to switch between a state of emitting a signal and a state of not emitting a signal and/or between distinct states of emitting signals at different respective frequencies.

4. The device according to claim 3, wherein, when the first sensor detects that the connection piece is in the second position and the second sensor changes from the second position to the first position, the controller is configured to perform at least one of: command the transmission member to remotely send a signal indicating the change in position of the control member, reduce the frequency of the remote sending of signals by the transmission member.

5. The device according to claim 1, wherein the second valve comprises a pressure sensor in the second internal fluid circuit, said pressure sensor generating an electrical measurement signal and being connected to the controller.

6. The device according to claim 1, wherein the second valve comprises a member for reading a radio tag.

7. The device according to claim 6, wherein, when the first sensor detects a change of the connection piece from the first position to the second position and this detection is followed by a detection, by the second sensor of the control member changing from the first position to the second position, the controller is configured to activate the member for reading a radio tag and to process the received signal.

8. The device according to claim 5, wherein, when the first sensor detects that the connection piece is in the first position and, at the same time, the pressure sensor measures a pressure greater than a threshold or delivers a pressure measurement signal, the controller is configured to generate a visual and/or audio and/or electromagnetic warning signal.

9. The device according to claim 1, wherein the connection piece comprises a member for locking/unlocking the mechanical link of the first coupling member and the second coupling member.

10. An assembly for storing pressurized fluid, comprising the device according to claim 1.

* * * * *